United States Patent
Peterson et al.

(10) Patent No.: US 6,687,070 B1
(45) Date of Patent: Feb. 3, 2004

(54) METHOD AND APPARATUS FOR READING DOWN-LEVEL TAPES HAVING DISTORTED MEDIA

(75) Inventors: David L. Peterson, Boulder, CO (US); Matthew P. Wojciechowski, Westminster, CO (US)

(73) Assignee: Storage Technology Corporation, Louisville, CO (US)

(*) Notice: Subject to any disclaimer, the term of this patent is extended or adjusted under 35 U.S.C. 154(b) by 407 days.

(21) Appl. No.: 09/614,192

(22) Filed: Jul. 11, 2000

(51) Int. Cl.[7] .................................................. G11B 5/09
(52) U.S. Cl. ......................................... 360/53; 360/31
(58) Field of Search ............................. 360/53, 31, 25, 360/48

(56) References Cited

U.S. PATENT DOCUMENTS

| | | | |
|---|---|---|---|
| 3,761,903 A | 9/1973 | Bird, Jr. et al. | 340/174.1 |
| 3,869,721 A | 3/1975 | Korda | 360/77 |
| 5,050,018 A | 9/1991 | Georgis et al. | 360/77.16 |
| 5,124,851 A | 6/1992 | Masui et al. | 360/53 |
| 5,191,491 A | 3/1993 | Zweighaft | 360/77.13 |
| 5,323,276 A | 6/1994 | Ono | 360/53 |
| 5,353,176 A | 10/1994 | Kosuge | 360/63 |
| 5,557,482 A | 9/1996 | Christensen et al. | 360/53 |
| 5,828,514 A | 10/1998 | Chliwnyj et al. | 360/77.12 |
| 5,870,243 A * | 2/1999 | Ukani et al. | 360/77.08 |
| 5,969,898 A | 10/1999 | Hansen et al. | 360/77.16 |
| 6,038,092 A * | 3/2000 | Wojciechowski et al. | 360/53 |

* cited by examiner

Primary Examiner—David Hudspeth
Assistant Examiner—Varsha A. Kapadia
(74) Attorney, Agent, or Firm—Carstens, Yee & Cahoon, LLP

(57) ABSTRACT

A tape reader is designed to read down-level linear track tapes having a multiple number of new tacks in the positions of each older wider track and having tape subject to pack level tape distortions which may result from environmental stresses and inter-use delay time. If tracks are displaced with respect to ideal servo reference positions, then optimal down-level reading may require selecting segments from different new track choices along the length of the tape. Decision choices of tracks and longitudinal break points are based on a; combination of gathered metrics per tape and engineering knowledge of each product. These data are stored first in internal memory. Longer-term memory storage particular to each tape may include cartridge memory either in the form of possible cartridge chip memory or writing to a section of tape in each cartridge. Decisions may be optimized with increasing number of read cycles and supplemented by knowledge in longer-term cartridge memory. For strong tape distortion, an intermediate step requirement may be the separate reading of whole tracks into buffer memory per channel and then reading the alternate track choice separately while selecting the proper segment of each track on a per channel basis.

21 Claims, 6 Drawing Sheets

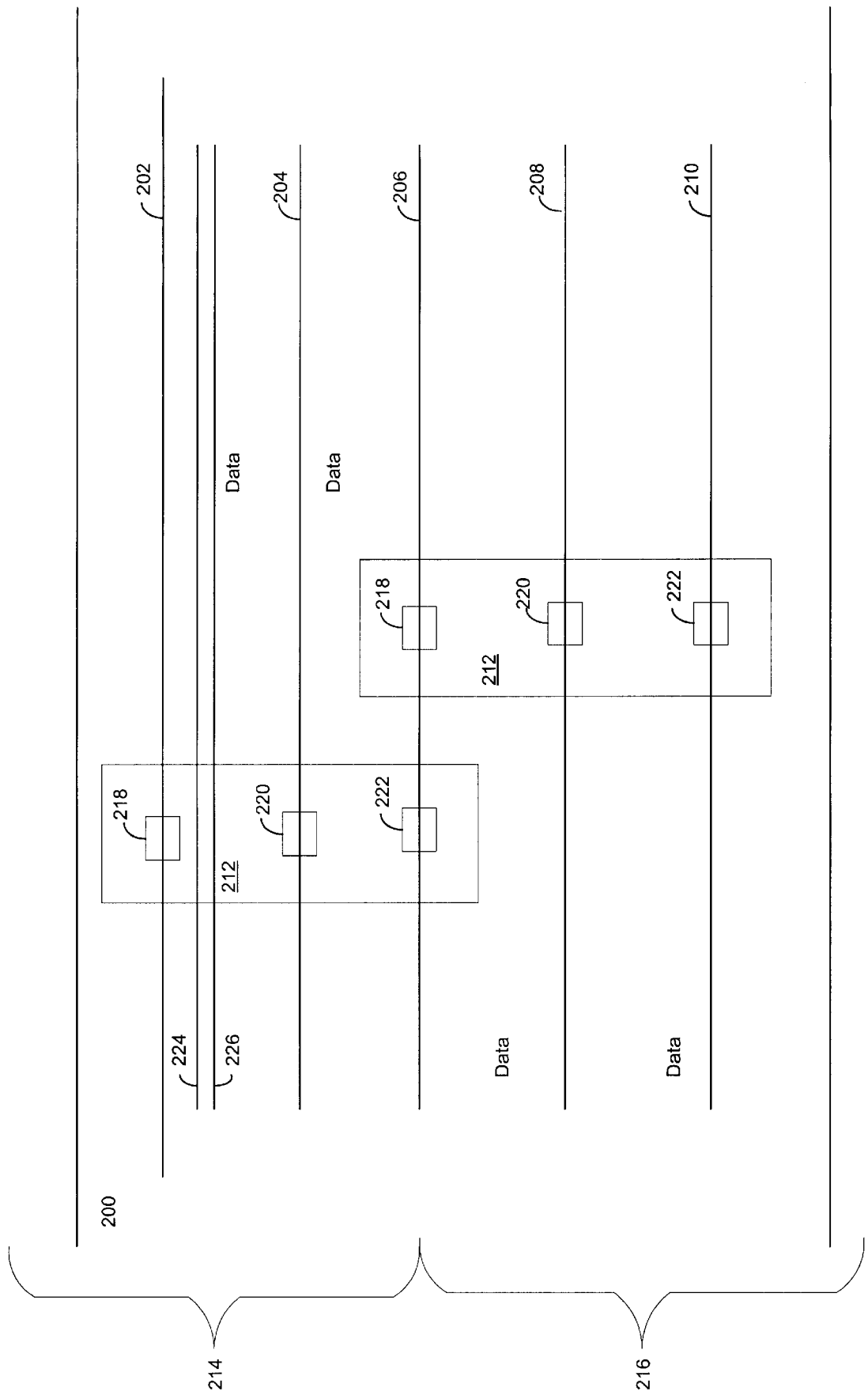

00-016-TAP 00-016-TAP

Figure 5A 00-016-TAP

Channel 1

| Track | Ending LP |
|---|---|
| 1 | EOT |

Figure 5B 00-016-TAP

Channel 2

| Track | Ending LP |
|---|---|
| 1 | BP1 |
| 2 | BP2 |
| 1 | EOT |

Figure 5C 00-016-TAP

Channel 3

| Track | Ending LP |
|---|---|
| 2 | EOT |

METHOD AND APPARATUS FOR READING DOWN-LEVEL TAPES HAVING DISTORTED MEDIA

BACKGROUND OF THE INVENTION

1. Technical Field

The present invention relates to a system and method for reading tapes and, in particular, to a method and apparatus for reading down-level linear track tapes with distorted media.

2. Description of Related Art

As magnetic recording tape becomes thinner and recording track widths become narrower, concern for the effects of tape distortion become more important.

In addition to having wider tracks, the older down-level writing is also usually subject to looser geometric =tolerances than is writing for more recent follow-on products that may use the same tape, but have double (or an integral multiple of) the previous track density. When the up-level product has designated tracks together occupying the same space as previously written tracks, the up-level reading of old data may have a higher proportion of track misregistration with respect to track widths and may be sub-standard. This situation is the problem of "backwards compatibility" and may require special data "recovery" procedures in severe cases. This problem is especially true if the old tracks are strongly curved along the length of the tape due to previous tension or compression pack profiles as a function of wound pack radius.

A tape pack refers to the tape wound onto a reel or spool and its width distortions can be coupled with temperature and/or humidity stresses along with time of exposure stresses. In some longitudinal positions, the new track, closer to one old track edge, may be more optimal than a new track closer to the opposite track edge. If a down-level wider tape track is being read by a narrower new-generation head read element in one of the possible track choices overlapping the wider track, the distortion-caused curvature of the old wide track may result in the chosen new track narrow reader being out of position. In that case, the new reader may pick up off-track adjacent track signal, old written signal, extra noise, or fringing fields that may degrade quality of the desired track signal. This may cause read errors. Even after error correction attempts, a badly mispositioned reader may find the desired readsignal to be unreadable.

The usual response to a tape error is that a retry is then attempted in which the tape motion is stopped, a certain amount of rewind occurs to a region at or before errors occurred, and a reread is done. This pattern is sometimes referred to as a "football," because of its appearance when plotted as velocity versus distance. A certain number of retries in place or with minor transverse repositions may occur. The prior art offers "reposition retries" as an attempt to avoid the region of tape debris impact or to assist the clean up of previous debris between tape and recording head or to alleviate the impact of momentary tape edge damage.

SUMMARY OF THE INVENTION

The present invention concerns multi-track linear tape with specially written servo patterns and servo readers separate from data readers. The pre-written servo patterns are maintained and common to both generations.

The present invention repositions the reading by using one or more large increment whole new-track spacings in a systematic manner in-response to pack level tape distortion, rather than by using minor position error signal (PES) distance adjustments. In the general case, this will involve the reading of both new track choices and selecting appropriate segments of each for optimal track reconstruction on a per channel basis. This reading technique will require the memory storage of first pass individual channel reads or segments of read lengths into a buffer. The optimal reading of different groups of channel reads will have to occur separately on different passes such that total tracks of optimal reads have to be reconstructed from buffer memory or from a combination of previous read memory and current reading. While this reading procedure may be performed for individual isolated read events, a preferred embodiment of the present invention involves selection of segments from alternate track choices over large longitudinal sections of tape.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram illustrating a tape reader according to a preferred embodiment of the present invention;

DETAILED DESCRIPTION OF THE PREFERRED EMBODIMENT

Figure 1:
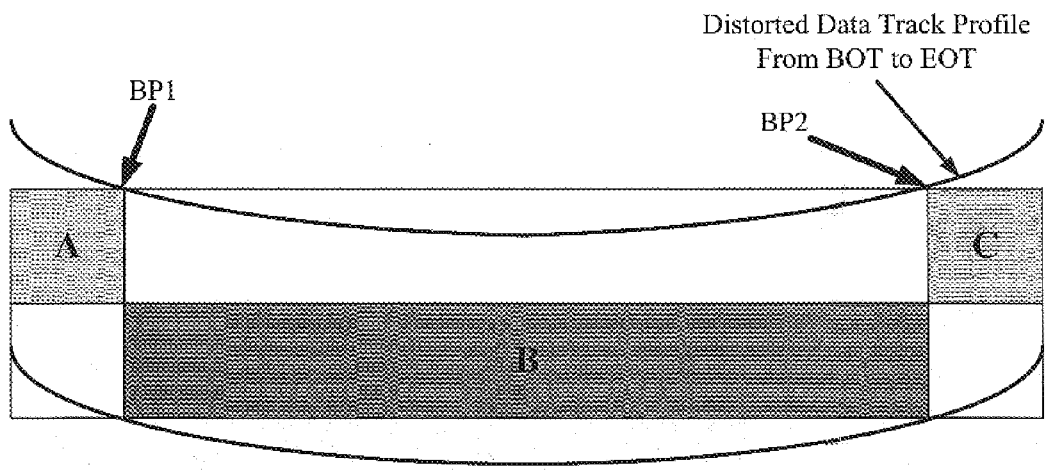
FIG. 1 is a diagram illustrating a track reading according to a preferred embodiment of the present invention.

Before turning to a detailed discussion of the invention, useful conventions and definitions are presented for discussion: An axially symmetric tape pack coordinate system have dimensions "r," for radius of the tape on the pack, and "z," the distance from lower tape edge to upper tape edge transverse to the longitudinal tape position. If the tape were unwound and laid out linearly, then "L" or "x" is the linear distance from beginning of tape towards end of tape. Sometimes the term "LP" for longitudinal position is used to represent the linear distance from beginning of tape towards the end of tape. The term "BOT" is used for the initial useful position of tape (beginning of tape), and the term "EOT" is used for the ending useful position of tape (end of tape). Some degree of tape distortion curved tracks is present due to gradual changes in tape stresses, such as tension and tape pack compression as a function of L (or "r"). In some cases, the stresses may also vary with z. For example, the stresses may vary with z when the pack hub has asymmetrical internal support or stiffness with z. A response to these tape stresses over temperature, humidity, and exposure time is the distortion of the tape in the z direction. Distortion in the z direction due to these stresses is referred to as "transverse creep."

Creep is the viscoelastic dimensional response to stress, following the initial elastic response. Creep displacements are much longer lived than elastic displacements. If creep accumulates due to high temperature exposure then the creep will tend to be a permanent distortion with respect to normal operating or storage temperatures. One example of high temperature exposure is shipping stress.

If an extra ounce of tension were applied to a tape, the distance between servo tracks would decrease (see discussion of FIG. 2 below). When the tension is released, the distance between the servo tracks increases. In other words, the tape will widen and narrow in a similar fashion as at elastic rubber band. However, tape is visco-elastic. In outer areas of the spool, the tension drives the visco-elastic creep in the direction of tension narrowing, but creep can drastically amplify the tension response and make it nearly permanent. In particular, an increase of tension of one ounce might narrow the tape by about 125 parts per million (ppm), but the final creep due to overall tension and long term temperature exposure may be a distortion of 1200 ppm, much higher than the tension response.

Tape "shrink" is an inelastic progressive narrowing of the tape due to normal aging and environmentally accelerated aging. Shrink does not occur in all types of tapes, but in some it could range from 0 to 600 parts per million (ppm) narrowing of tape width. This narrowing could add onto creep to assist in mislocating previously written data tracks. Since both shrink and tension-induced creep act to narrow tape, a preferred first track choice is towards "central servo reader" transverse location (see details for FIG. 2).

For convenience, the term "gen_1" is referred to as the down-level tape system having older wider tracks and to "gen_2" as the new generation up-level tape system having narrower tracks. Creep and shrink may shift the previously written gen_1 tracks so that only one of the newer gen_2 track choices may now work adequately. These generations may share the same servo stripes with each stripe being defined as a set of adjacent servo tracks written at some transverse location on the tape (for example, five servo tracks per servo stripe). "Off-Line Recovery" consists of the tape drive reading data and attempting recovery while the host communication is temporarily halted or suspended. Communication is then restored after data recovery and data is sent to the host computer. Therefore, Off-Line Recovery mode refers to activity that occurs outside of actual reading or writing times. For example, before the first gen_2 reading of a data track on a down-level gen_1 tape, some extra time may be spent gathering data on tape characteristics prior to the official read to host. This data gathering would be "off-line" sampling mode to facilitate data recovery. "Off-Line Sampling" is used during Off Line Recovery when the data and tracks are sampled. In worst case severe tape distortions, "Off-Line Recovery" may also require multiple pass reads for reconstruction of the read data over a partitioning of the read channels into several groups.

The present invention provides a mechanism in which decisions are made about which track choice to select for optimal reading, and that decision may vary along the length of the tape and possibly also will vary with which transverse portion of tape is being read, such as which "tape band". Decisions can be based on certain metrics that may include tape data error rates, counts of corrections for each track choice, track signal amplitude, and curvature of servo tracks noted by position error signals, PES, on a set of servo readers that may be involved in simultaneous reading of servo tracks. For example, for tape hubs that are symmetric in the "z" direction, the decision set for a track close to the upper tape edge should tend to be "mirror symmetric." That is, distortion in an upper band towards the top of the tape should be symmetrical with distortions in a lower band equidistant from a mid-line, or medial tape line, along the entire tape length.

The PES measure needed is by servo element error in position. Usually, a high position error signal indicates the composite result of the average of all servo readers in use. However, tape distortion of the servo tracks is measured by the differences of the individual servo element PES readings. Many tape systems use two or even three simultaneous servo readings and then look for distortions by the differences between these reads. The systems with only one servo track guiding data reads would be handicapped.

Modeling of pack level stresses can suggest probable choice sets. For example, if the effective tape tension is negative on the inner third of a spool, then the combination of negative compressive-tension and radial-compressive stress may increase the tape width. The low compression and positive tension near the outer part of a tape spool may lead to tape stretching and width narrowing, which distorts tracks in the other direction. Further, exposure to high temperature may expand a tape pack leading to higher effective tensions. Then, room or normal operating temperatures may result in a relatively "locked in" tape tensions. Consequently, room or normal operating temperatures may result in a relatively "locked in" tape width creep profile. Humidity may also expand a tape pack and facilitate creep. Once the decision set of which tracks to use and where the break points are located has been made, this information may be stored in a lookup table in read-only memory (ROM). Additional runs and samples help to update the ROM table.

In this example, the first attempt to read a down-level tape begins with a standard default wrap (a pass reading all channels so that the number of tracks involved is equal to the number of channels). If this default choice succeeds, then no down-level corrective action is needed. The consideration of creep and shrink of the tape may make this default choice non-optional for at least some of the tracks in the wrap. If one could consider tracks just a channel at a time, then optimal reads may often consist of choosing the lower tracks (or channel reads per wrap) for those read elements above central servo and upper tracks for those reads below central servo. This is because the combination of creep and tape shrinkage over time may distort the data and servo tracks towards the central servo line (see discussion for FIG. 2). Then, the new narrow track choice towards the central servo line would be more appropriate on a per element or per channel basis. While the default read mode is being performed, quality statistics may be gathered along the tape over a suitable partition—a set of potential breakpoints—of the length of the tape into segments. For example, candidate break points may be set for every 10–20 meters of tape. An alternative to a pre-set partition is using running averages of statistics over a previous number of meters of tape. One example of statistics is a running average of the number of device blocks corrected and running average of transient errors and more resistant temporary errors.

When a single summary or set or figure of merits of these statistics indicates that the default choice is not suitable, then the present invention switches to off-line recovery mode. The present invention then notes the longitudinal break points at which the tape becomes unreadable and apply engineering knowledge of tape distortions gathered from tape width measurements and position error signal profiles longitudinally along tape over years of previous measurements. This knowledge will vary with the type of tape system being used. Most tapes are large "end loaded tapes" with a single spool that may lie inside a cassette. For these tapes, distortions will tend to be monotonic from one end to the other end and only one break point needs to be considered: the break point at which the tape becomes unreadable.

There are unreadable cases in which no break points need to be considered. One whole track choice will suffice for some channels, but possibly another choice will be chosen for other channels.

Some newer cartridges are center-loaded cartridges with two spools in each tape cassette. Center loading gives symmetrical tape distortion about the longitudinal center-of-tape and, hence, the possibility of having two break points exists. The symmetry of FIG. 1, for example, would be relevant to center-tape loads.

There may even be more than two break points because the center of tape often has zero applied storage tension and hence a "central dip" from full to zero tension at center of tape.

The worst case may then consist of four break points and best case of zero break points that still require reconstruction of good reading from different channels selecting optimum choices from opposite track choices. The initial reading on center-loaded cartridges is probably the most difficult, because the peak of creep from tension is nearby. Most multi-track tapes have a multiplicity of channels simultaneously reading tape tracks in a given tape band. Accordingly, the present invention considers segments of optimal track choices for each channel separately. Most multi-track linear tapes have a multiplicity of channels simultaneously reading tape tracks in a given tape band. Therefore, the reader of the present invention must consider segments of optional track choices for each channel separately.

A tape "wrap" is a full-length of tape being read or written over all channels in a given tape motion direction. Preferably, at least one wrap per band is sampled in anticipation that decisions about that wrap will be suitable for other wraps close to the first wrap sampled. Often the first wrap examined will be close to the medial line of the tape and that also happens to be at some significant distance from "central servo line." Therefore, if tape distortion problems occur, they will probably be experienced here. If this wrap performs well, all other wraps will also be likely to perform well. If this wrap has poor read quality, then the other wraps far from central servo may also perform poorly. The present invention applies intelligence to anticipate and show consistency. This also means that it may not be necessary to read all wraps in off-line recovery mode.

Referring to FIG. 1, a diagram is shown illustrating a track reading according to a preferred embodiment of the present invention. The width of the 9840 track corresponds to two tracks for the TA44 machine. In down-level read mode, the machine will ultimately select the upper-most track choice, section A, until breakpoint BP1. Due to the distortion, the machine optimal choice switches to the lower track at the breakpoint and reads section B. The machine reads the upper-most track, section A, until breakpoint BP1. Due to the distortion, the machine switches to the lower track at the breakpoint and reads section B. At breakpoint BP2, the machine switches to the upper track and reads section C.

Turning now to FIG. 2, a diagram is shown illustrating a tape reader according to a preferred embodiment of the present invention. A tape 200 has a number of servo tracks 202–210. Data is located in the regions between servo tracks 202–210. In these examples, read head 212 may be positioned in an upper position 214 or a lower position 216 to read the upper or lower portion of tape 200. Servo elements 218–222 serve to maintain the position of read head 212 along tape 200 when reading or writing data. Also note line 206 is the medial line of the tape dividing the tape into upper and lower parts, which would also be tape data bands in this example. Lines 204 and 208 are "center servo" lines. Each band will tend to view tape distortion symmetrically about these center servo lines.

The present invention solves the problem of data track distortion that occurs when tape creep and shrink and humidity effects alter expected track locations with respect to the averaged reading of servo tracks. The creep profile over longitudinal distance x may result from the radial and circumferential stresses in the tape pack, and the shrink may result from a decrease in tape porosity over time. For example, circumferential or tension induced creep combined with shrink acting on tape 200 may cause the distance between servo tracks 202, 204, and 206 to decrease together. If ideal servo location is determined by the averaging of the reads from tracks 202, 204, and 206, then written data tracks lying closest to outer track locations 202 and 206 may be most strongly distorted in location by inelastic creep and shrink. An "upper group" of data readers is considered to be those readers that lie between servo readers 218 and 220 and a "lower group" of data readers is considered to be those readers that lie between servo readers 220 and 222. For tapes having uniform transverse tape distortion, these two groups may have to be considered separately. Each of these groups include a set of data readers with "outer" data readers lying away from central servo 204 and a set of data readers with "inner" data readers lying closer to central servo. Other systems may only have two or even one servo reader instead of the three shown here. However, these systems will still govern the locations of several data readers with some being near to the average read or "central servo" location and some being farther away. Data elements further from central servo will be more subject to the effects of track distortion.

New generation sample tracks 224 and 226 represent two narrower gen_2 tracks that may initially be intended to overlay an older gen_1 wider data track. In the absence of distortion, either of these tracks may suffice for the gen_2 reading of the old gen_1 written data. With movement of the gen_1 written track due to distortion, only one of these new gen_2 choices may now be adequate with the other now being badly off-track and subject to excessive read errors. The present invention may read a portion of data from track 224 and another portion of data from track 226 to account for the overall distortion profile of the tape 200.

In more detail, if the tape is narrowing uniformly, the upper band will see lines 202 and 206 being pulled towards line 204. Separately, the lower band will view lines 206 and 210 being pulled towards its center servo line 208. For the particular case of tape narrowing, the old gen_1 written data at positions 224 and 226 will be pulled towards central servo line 204, thus requiring an "upper group" choice. Since the read head is relatively rigid compared to the flexible tape and since tape narrowing often is dominant over tape widening, head read track choice for line 226 usually has a better chance of reading previously written wide gen_1 data than choice 224. However, ends of tape that used to be at interior pack may tend to widen, and choice 226 might then become more relevant. If these track choices were positioned between tracks 204 and 206 and if the tape were narrowed uniformly, then the opposite choices of a "lower group" may be required.

If both tracks 224 and 226 fail on one set of servo triplets, another set may be available for data recovery. In some systems, tracks may be read either forwards or backwards using the "trailing" set of servo and data readers. This forward and backward reading offers a redundancy so that the alternate set is available for recovery if needed. For very severe distortion, it is also possible to access an adjoining data track read not normally designated for the reading of the original wide track.

The most common distortion encountered will probably be that in which the combination of creep and shrink has essentially narrowed the entire track towards central servo. In that case, no break points may be needed. But a problem may still exist, and both the upper and lower track choices have to be read but will be applied to different channels for reassembly.

The memory requirements of full track buffer storage per channel are large. If this buffer storage is required inside the machine, then it is best to break the reads into short distances with reading of both track choices over each short distance. Read data will then be sent to the host at a reduced overall transfer rate. However, in this case, recovery may be more important than transfer rate.

In an alternate embodiment of the present invention, full data tracks are stored in external memory with special facilitated reading using another storage device, such as a redundant array of independent disks (RAID) drive or another tape drive. On subsequent passes, the remaining number of data tracks are read, perhaps with some retries, such that in the final pass all the data tracks may be reconstructed from memory or perhaps from another "slave" tape drive or disk drive. Data reconstruction may be done in the tape machine drive with much additional memory but could be more efficiently done in an additional disk or tape drive or even a bank of tape drives. This technique would reduce the extra cost of a single drive and possibly use idle equipment or lesser expensive tape drives for data recovery.

The present invention reads a selected track on the tape and monitors for errors. If the errors are greater than a threshold, the reader of the present invention reads the remainder of the track and selects an alternate track to read. The present invention then reads the alternate track and monitors for errors. Thereafter, the present invention generates a data structure and stores partitions of good tracks therein. Subsequent reads of the tape are performed using the data structure to select between tracks, such that the reader reads good partitions of each track to make up the entire down-level tape track.

Figure 3A:
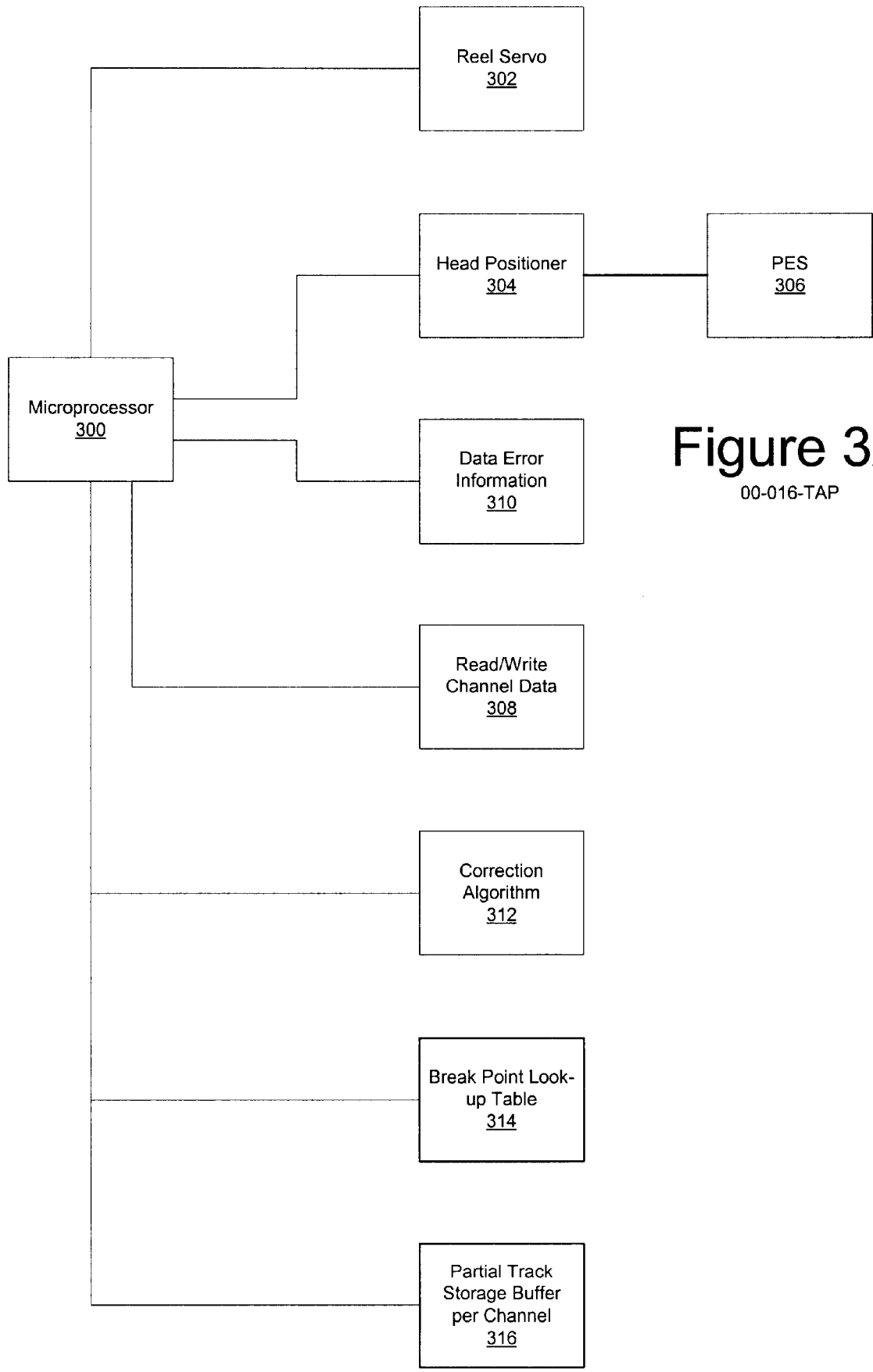
FIGS. 3A and 3B are block diagrams illustrating components in a tape drive system used to implement the present invention.
Figure 3B:
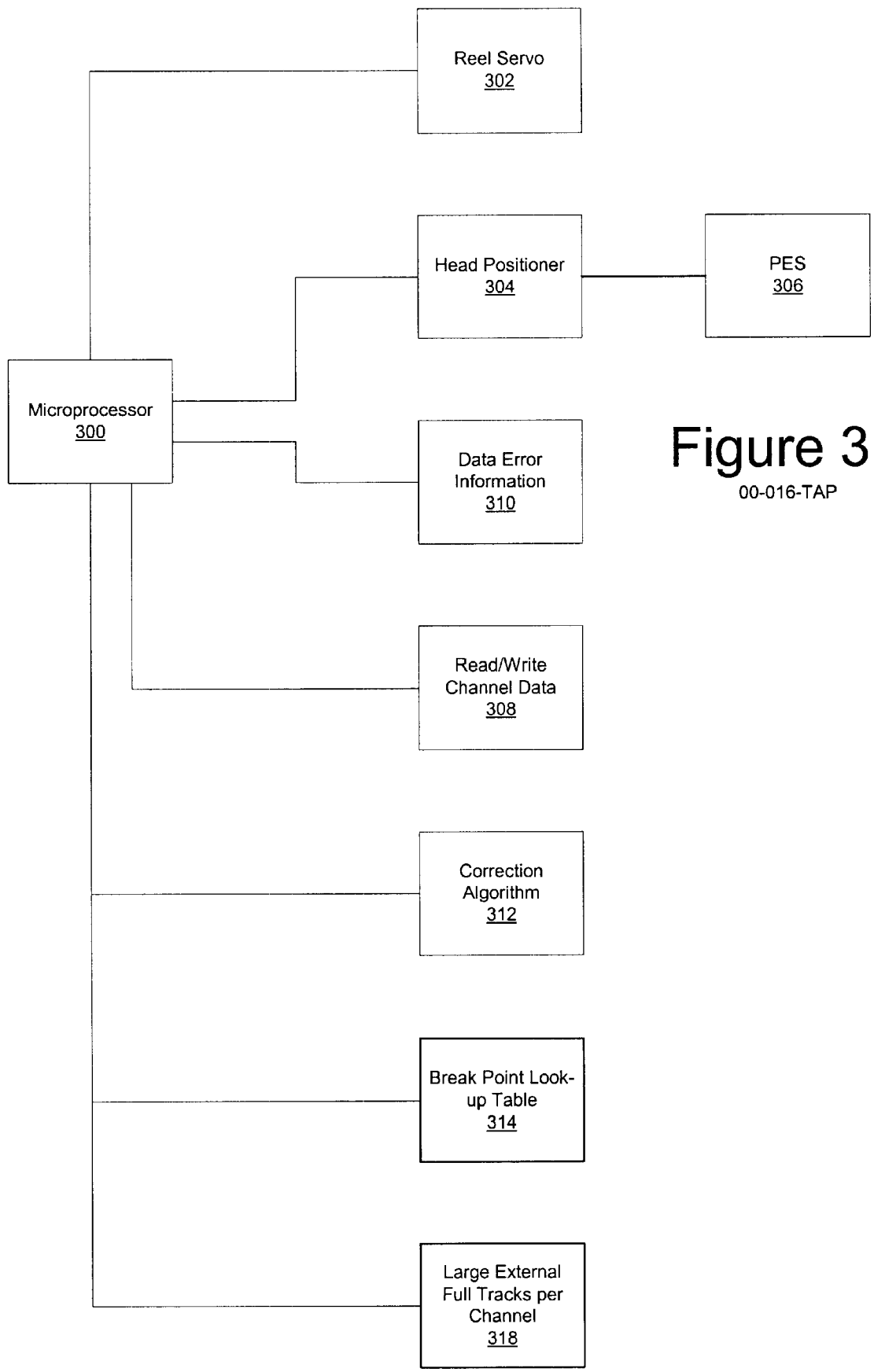

With reference now to FIG. 3A, a block diagram is shown illustrating components in a tape drive system used to implement the present invention. All of the processes, in this example, are controlled by microprocessor 300. Real servo 302 serves to move the tape forward and backward. Head positioner 304 moves a tape head, such as read head 212 in FIG. 2. PES 306 provides a position error signal generated from servo elements, such as servo elements 218–222 in FIG. 2. Read/write channel data 308 receives data from read/write elements in the read head. Data error information 310 is used to provide information as to when errors are greater than a threshold. Correction algorithm 312 is used to determine which data tracks should be read. Initial or default track choice reads are stored in partial tracks in internal memory 316 as a storage buffer for each separate channel. In an alternate embodiment shown in FIG. 3B, initial or default track choice reads are stored in a large external facilitating memory 318 consisting of external tape or disk drives or solid state disk probably using full track data storage for each and every channel. Alternately, only those track segments deemed necessary for track reconstruction may be stored in the buffer or external memory. Reconstruction then uses this track storage along with new reads using the alternate track choice either in real time reading or with use of both tracks from memory storage.

Figure 4:
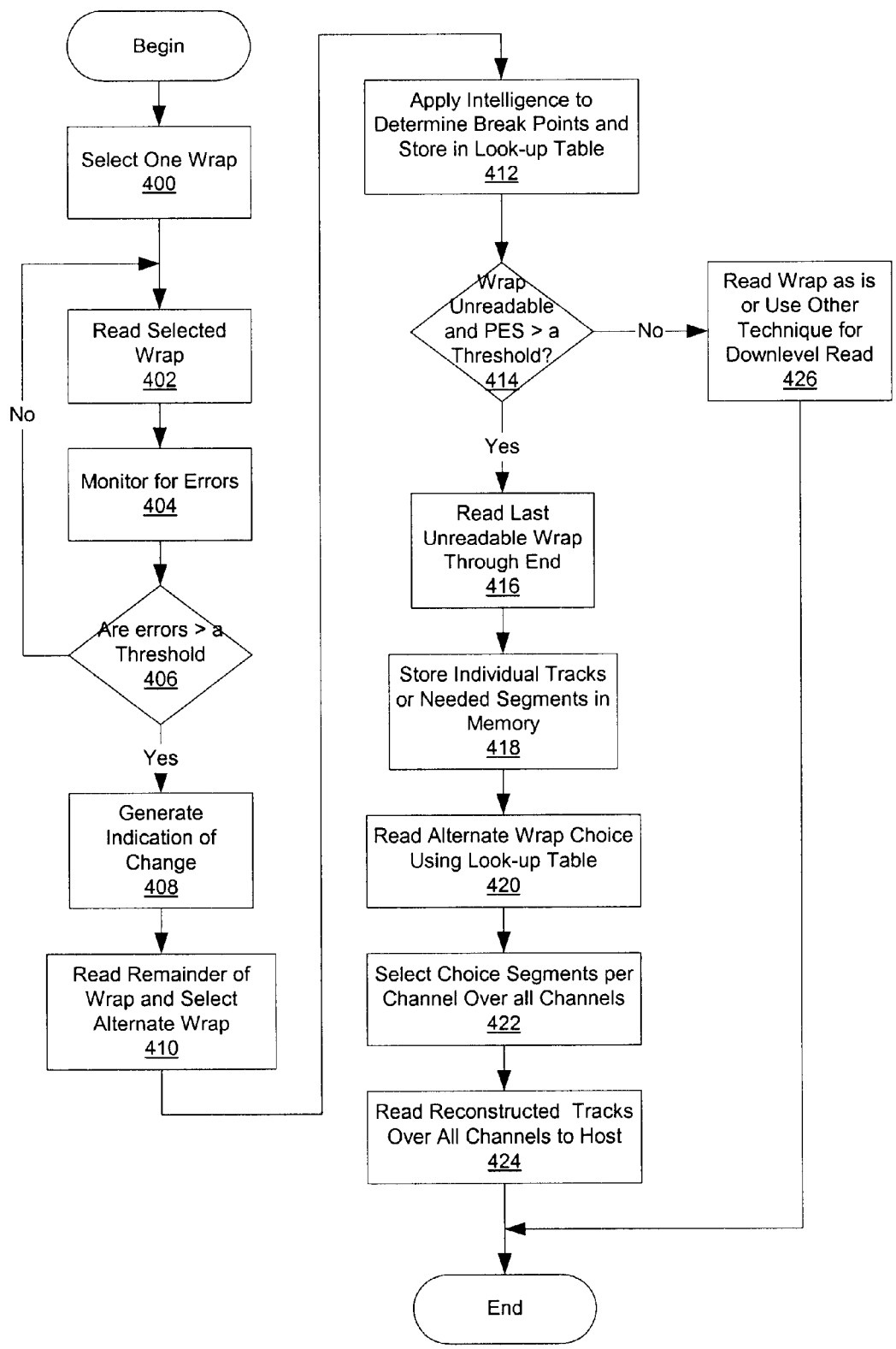
FIG. 4 is a flowchart illustrating a process for managing multiple pass reads in accordance with a preferred embodiment of the present invention; and, FIGS. 5A, 5B, and 5C are diagrams illustrating examples of look-up tables in accordance with a preferred embodiment of the present invention.

Turning now to FIG. 4, a flowchart is shown illustrating a process for tracks reconstruction by channels and for determining when different tracks should be utilized for reconstruction in accordance with a preferred embodiment of the present invention. The process begins by selecting a data wrap (step 400). This really means selecting a wrap from gen_2 reading, which encompasses many data tracks over all possible data read channels simultaneously. This wrap is selected transverse setting of the hard tape head over the flexible tape. One of these tracks in one of the channels may be, for example, data track 224 in FIG. 2. The selected wrap is read (step 402). Errors are monitored as the wrap is read (step 404). A determination is made as to whether the detected errors are greater than a threshold (step 406). If the errors are not greater than a threshold, the process returns to step 402 to continue to read the data track.

If errors are greater than a threshold in step 406, an indication of a change is generated (step 408) and the process reads the remainder of the wrap and selects an alternate track (step 410). This alternate track may include, for example, track 226 in FIG. 2. Then, engineering intelligence is used to set break point choices and these choices are stored in lookup table memory (step 412). A determination is made as to whether the wrap is unreadable and PES is greater than a threshold. If either the wrap is readable or PES is not greater than a threshold, the process reads the wrap or uses other known techniques for down-level read (step 426) and ends.

If the wrap is unreadable and PES is greater than a threshold in step 414, the process reads the last unreadable wrap through end of tape (step 416). Thereafter, the process stores individual tracks or needed segments in memory (step 418) and reads alternate wrap choices using the look-up table (step 420). The individual tracks or needed segments are read form one of the gen_2 track corresponding to the gen_1 track on the tape. The wrap reads are stored in memory on a per-track or per-channel basis. The reads are stored in either internal short buffer memory or large external memory.

At this point the process may read in real time to the host using parts of this new alternate wrap and segments from the stored memory all combined together per channel for all channels read through full error correction code and out to the host. Alternatively, if desired, the present invention may also read this new alternate wrap to large external memory and then recombine the two later. Then, the process selects choice segments per channel over all channels (step 422) and reads reconstructed tracks over all channels to host (step 424), and ends.

In this manner, data may be read from a track containing the least number of errors to read the desired data. Although the look-up table is described as a table here, a person of ordinary skill in the art will recognize that the information about good partitions in each read track may be stored in any data structure. According to a preferred embodiment of the present invention, the reading process reads to an end of tape and, in one particular example, the reading process may then read to another wrap in the opposite band. Once that wrap is completed to its end of tape, the process returns to an adjacent wrap near the original wrap in the first band and continues. The process discussed here only pertains to one tape band at a time. The other tape band is processed in a similar fashion according to this procedure in parallel with the procedure for the first tape band. The results of both forward and backward wraps are used for logical consistency.

With reference now to FIGS. 5A, 5B, and 5C, diagrams are shown illustrating examples of look-up tables in accordance with a preferred embodiment of the present invention. Particularly with respect to FIG. 5A, a table illustrates the breakpoints corresponding to the reading of channel 1. The read begins at beginning of tape (BOT) with track 1, as denoted in the "Track" column in the first row. The read proceeds until the read reaches the LP in the first row in the "Ending LP" column. In the example shown in FIG. 5A, default track 1 is read until end of tape (EOT). Once EOT is read from the "Ending LP" column, read of that channel stops.

With reference to FIG. 5B, a table illustrates the breakpoints corresponding to the reading of channel 2. The read begins at BOT with track 1, as denoted in the "Track" column in the first row. The read proceeds until the read reaches BP1, denoted in the "Ending LP" column in the first row. Next, the read switches to track 2, as denoted in the "Track" column in the second row, and proceeds until the read reaches BP2, denoted in the "Ending LP" column in the second row. Thereafter, the read switches to track 1, as denoted in the "Track" column in the third row, and proceeds until the read reaches EOT, as denoted in the "Ending LP" column in the third row. The read of channel 2 illustrated in FIG. 5B may describe, for example, the track reading illustrated in FIG. 1, where section A corresponds to the first row, section B corresponds to the second row, and section C corresponds to the third row.

With reference now to FIG. 5C, a table illustrates the breakpoints corresponding to the reading of channel 3. The read begins at beginning of tape (BOT) with track 2, as denoted in the "Track" column in the first row. The read proceeds until the read reaches the LP in the first row in the "Ending LP" column. In the example shown in FIG. 5C, alternate track 2 is read until end of tape (EOT). Once EOT is read from the "Ending LP" column, read of that channel stops.

Thus, the present invention allows reading of down-level tapes by selecting the best segments of each of the gen_2 wrap overlying the older gen_1 wraps in response to large pack level tape distortion. While this reading may be done for individual isolated events, a preferred embodiment of the present invention involves performing the whole track adjustments for a large longitudinal section of tape. The present invention takes advantage of the fact that the up-level product has multiple tracks in the spacing of a single track of the down-level tape by alternating tracks based on whether the detected errors are greater than a threshold.

It is important to note that while the present invention has been described in the context of a fully functioning system, those of ordinary skill in the art will appreciate that the processes of the present invention are capable of being distributed wholly or partly in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the present invention may build a table for each read of the track and store the table in random access memory (RAM), rather than ROM. Longer-term memory storage particular to each tape may include cartridge memory either in the form of possible cartridge chip memory or writing to a section of tape in each cartridge. Also, if the up-level product has greater than two tracks in the spacing of one track of the down-level tape, the present invention may read several alternate tracks and add the partitions of good tracks to the look-up table. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for reading a linear tape, comprising:

reading a first track on the linear tape;

monitoring for errors on the first track;

determining whether errors on the first track exceed a threshold; and reading a second track on the linear tape in response to errors on the first track exceeding the threshold.

2. The method of claim 1, further comprising:

generating a data structure of good partitions of the first track and good partitions of the second track.

3. The method of claim 2, further comprising:

performing subsequent reads of the linear tape using the data structure.

4. The method of claim 3, wherein the step of performing subsequent reads of the linear tape comprises:

alternating between the first track and the second track, reading only good partitions of each track, wherein the good portions and read during a given tape motion direction.

5. The method of claim 2, wherein the data structure is a look-up table.

6. The method of claim 1, further comprising:

monitoring for errors on the second track;

determining whether errors on the second track exceed the threshold; and reading a third track in response to errors on the second track exceeding the threshold.

7. The method of claim 1, wherein the reading step comprising:

reading the second track after all of the first track on the linear tape has been read, wherein points at which errors on the first track exceed a threshold are used to identify good partitions on the first track.

8. An apparatus for reading a linear tape, comprising:

means for reading a first track on the linear tape;

means for monitoring for errors on the first track;

means for determining whether errors on the first track exceed a threshold; and means for reading a second track on the linear tape in response to errors on the first track exceeding the threshold.

9. The apparatus of claim 8, further comprising:

means for generating a data structure of good partitions of the first track and good partitions of the second track.

10. The apparatus of claim 9, further comprising:

means for performing subsequent reads of the linear tape using the data structure.

11. The apparatus of claim 10, wherein the means for performing subsequent reads of the linear tape comprises:

means for alternating between the first track and the second track, reading only good partitions of each track.

12. The apparatus of claim 9, wherein the data structure is a look-up table.

13. The apparatus of claim 8, further comprising:

means for monitoring for errors on the second track;

means for determining whether errors on the second track exceed the threshold; and means for reading a third track in response to errors on the second track exceeding the threshold.

14. An apparatus comprising:

a tape head positioned to read a first track on a linear tape;

a processor for monitoring for errors on a first track and determining whether errors on the first track exceed a threshold; and a head positioner for positioning the tape lead to read a second track in response to the errors on the first track exceeding the threshold.

15. The apparatus of claim 14, further comprising:

a persistent storage for storing a data structure of good partitions of the first track and good partitions of the second track.

16. The apparatus of claim 15, wherein the head positioner positions the tape head to perform subsequent reads of the linear tape according to the good partitions of the first track and good partitions of the second track in the data structure.

17. The apparatus of claim 16, wherein head positioner positions the tape head to perform subsequent reads of the linear tape by alternating between the first track and the second track, reading only good partitions of each track, wherein the good portions and read during a given tape motion direction.

18. The apparatus of claim 15, wherein the data structure is a look-up table.

19. A computer program product embodied on a computer readable medium for reading a linear tape, comprising:

instructions for reading a first track on the linear tape;

instructions for monitoring for errors on the first track;

instructions for determining whether errors on the first track exceed a threshold; and instructions for reading a second track on the tape in response to errors on the first track exceeding the threshold.

20. The computer program product of claim 19, further comprising:

instructions for generating a data structure of good partitions of the first track and good partitions of the second track.

21. The computer program product of claim 20, further comprising:

instructions for performing subsequent reads of the linear tape using the data structure.

* * * * *